Nov. 13, 1951     A. P. KING     2,575,058
MICROWAVE RADAR ANTENNAS
Filed Aug. 21, 1943     2 SHEETS—SHEET 1
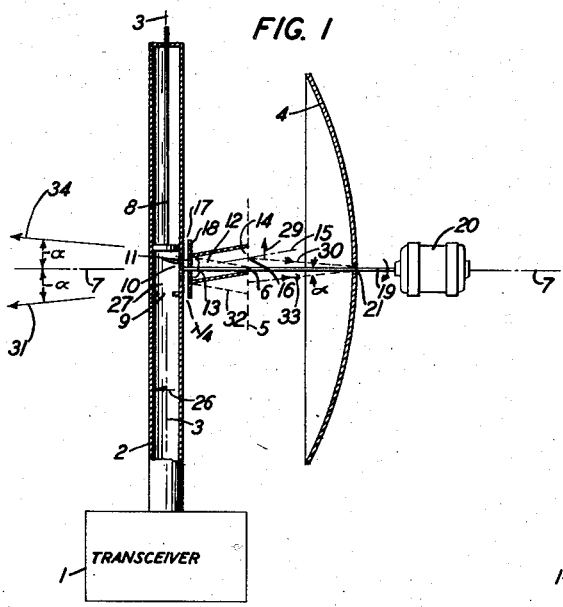
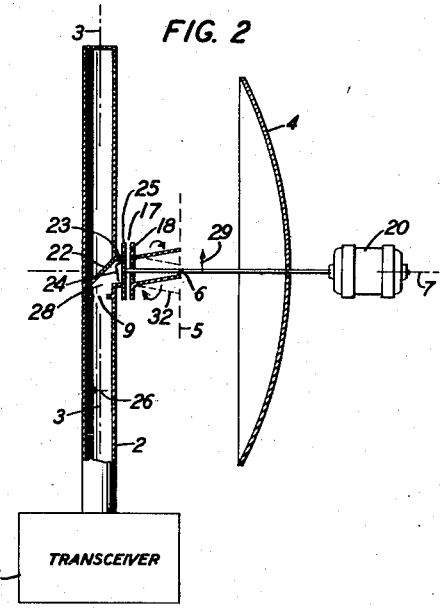
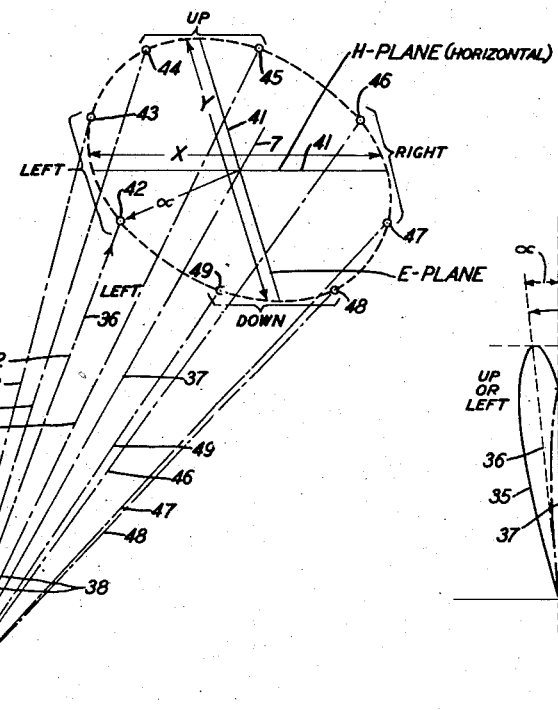
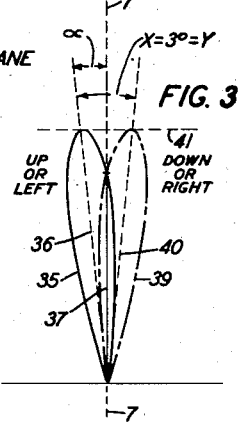
INVENTOR
A. P. KING
BY *A. J. Zerbarini*
ATTORNEY

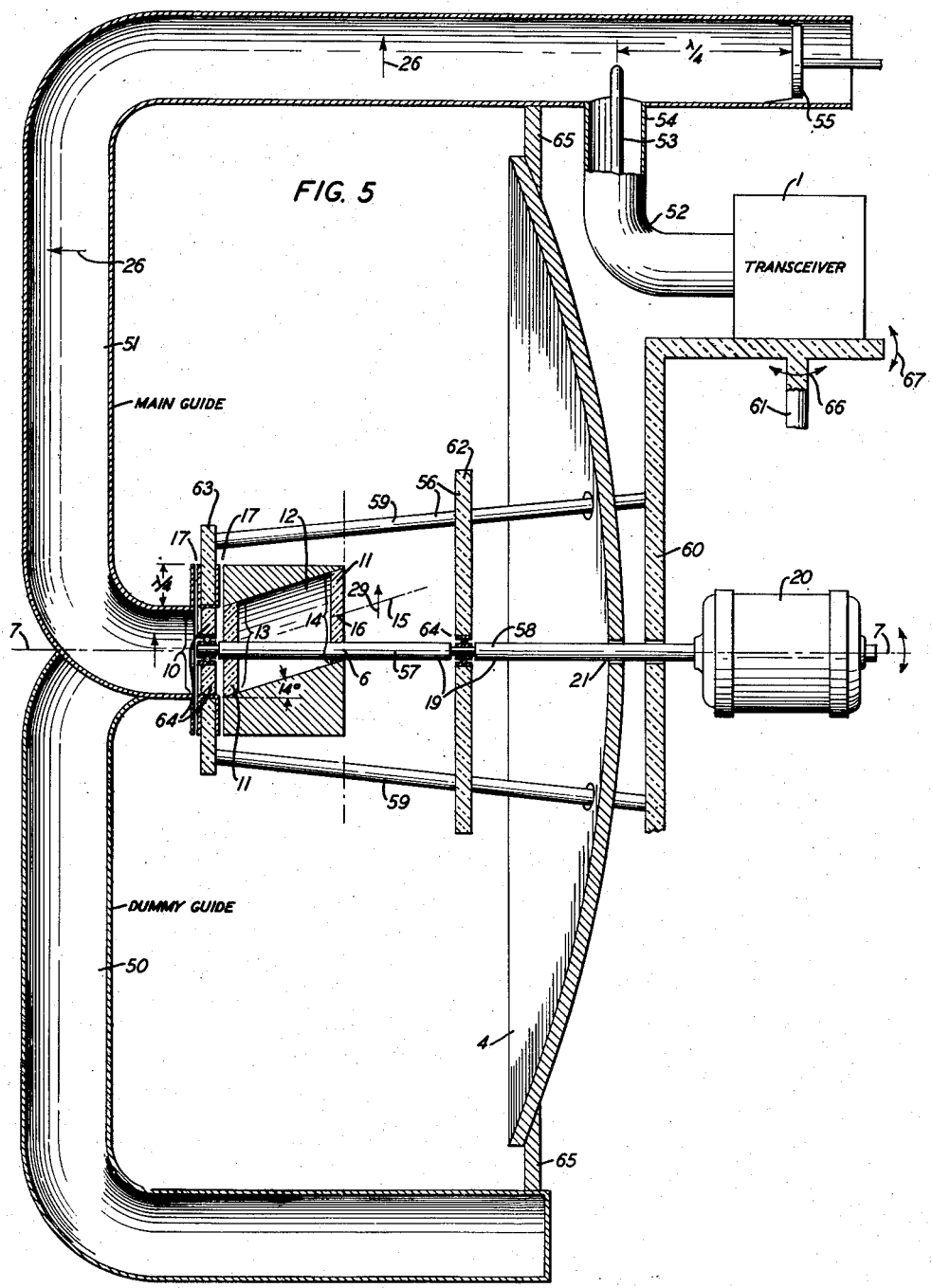

Patented Nov. 13, 1951

2,575,058

UNITED STATES PATENT OFFICE 2,575,058

MICROWAVE RADAR ANTENNA

Archie P. King, Red Bank, N. J., assignor to Bell Telephone Laboratories, Incorporated, New York, N. Y., a corporation of New York Application August 21, 1943, Serial No. 499,450

6 Claims. (Cl. 250—33.65)

This invention relates to directive antenna systems and particularly to microwave conical scanning antennas.

As disclosed in Patents 2,083,242 to W. Runge and 2,419,556 to C. B. H. Feldman, it has been proposed to secure, in a direction finding system employing decimetric waves and ultra-short waves (1 to 10 meters), lobe rotation about a minor lobe axis or so-called "conical scanning" by utilizing a dipole and a rotating reflector, the dipole being stationary with respect to the axis of the lobe rotation. While these prior art systems may be successfully used in the ultra-short wave and decimetric wave fields, they are not entirely satisfactory for use with microwaves, that is, with centimetric (1 to 10 centimeters) and millimetric waves (1 to 10 millimeters) and it now appears desirable to secure a conical scanning antenna especially adapted for use in the microwave field. Also, it appears to be desirable to utilize, as the pick-up or exciter element for a paraboloidal re-reflector having a point focus, a wave guide aperture antenna having a small size and a configuration similar to that of the reflector point focus, instead of a linear element such as a dipole. Moreover, it appears to be of an advantage in a conical scanning radar system to transmit and receive waves having a given fixed linear polarization for the purpose of eliminating fading in the echo pulse.

It is one object of this invention to determine with a high degree of accuracy the direction of an incoming radio wave.

It is another object of this invention to obtain in a centimetric or millimetric radar system efficient conical scanning or lobe rotation.

It is another object of this invention to secure lobe rotation without utilizing a rotating reflector.

It is another object of this invention to prevent fading of the echo pulse in a conical scanning radar system.

It is another object of this invention to obtain in a conical scanning system a rotating directive characteristic having negligible minor lobes.

It is another object of this invention to obtain in a conical scanning system a relatively small angle between the principal axis of the rotating lobe and the axis of lobe rotation.

It is a further object of this invention to employ in a conical scanning system simple, lightweight apparatus of small size for producing the conical scan.

In accordance with one embodiment of the invention, the longitudinal axis of an open-ended circular antenna wave guide is angularly related to the principal axis of a paraboloidal reflector. The aperture antenna at the open end of the guide is included in the focal plane of the reflector and spaced a small distance from the reflector focus. The antenna guide is connected to a radar transceiver by means of a stationary main transmission guide extending perpendicular to the reflector axis; and vertically polarized waves are supplied to and collected by the aperture antenna. Means are provided for rotating the axis of the short guide about the reflector axis, and therefore for rotating the center of the aperture antenna about the reflector focus, whereby the principal axis or radius of the maximum directive lobe describes in space a cone of substantially circular cross-section, and lobe rotation is secured without rotating the reflector. Means are also provided for vertically and horizontally moving the entire system for the purpose of aligning the reflector axis, which coincides with the axis of the directive cone, with any direction in space. Preferably, but not necessarily, the spacing between the center of the aperture antenna and the reflector axis is made approximately equal to, or less than, the radius of the antenna for the purpose of securing a small angle between the reflector axis and the axis of the lobe rotation.

The invention will be more fully understood from a perusal of the following specification taken in conjunction with the drawings on which like reference characters denote elements of similar function and on which:

Fig. 1 is a sectional view in elevation of one embodiment of the invention;

Fig. 2 is a sectional view in elevation of a different embodiment of the invention;

Fig. 3 is a plane diagram and Fig. 4 is a perspective diagram, used for explaining the directive operation of the embodiments of Figs. 1 and 2; and Fig. 5 is a cross-sectional view of a different embodiment of the invention.

Referring to Fig. 1, reference numeral 1 denotes a radar transceiver and numeral 2 denotes a main guide connected thereto and having a longitudinal axis 3. Preferably, the guide 2 has a circular cross-section but it may have a rectangular cross-section. Numeral 4 denotes a metallic paraboloidal reflector or paraboloid having a focal plane 5, a point focus 6 and a principal axis 7. The guide axis 3 and the reflector axis 7 are perpendicular to each other. Numeral 8 denotes an adjustable tuning piston positioned in the upper half of guide 2 and the numeral 9 denotes an orifice in the lower half of guide 2. Numeral 10 designates a circular opening in the side wall of guide 2, the opening containing a polystyrene plate or window 11. Numeral 12 denotes a short circular rotatable guide section having a circular opening 13 facing the opening 10 in guide 2 and having an antenna aperture 14 included in the focal plane 5. The opening 13 contains a polystyrene window 11 positioned opposite to the similarly designated window in the opening 10, and the aperture 14 is slightly elliptical. The longitudinal axis 15 of the short guide section 12 and the reflector axis 7 form an acute angle so that the mid-point 16 of the antenna aperture 14 is spaced from the focus 6 a distance preferably, but not necessarily, equal to the radius of the antenna aperture. Numeral 17 denotes a rotatable junction comprising the angular flange 18 of wave guide 12 spaced from the wall of guide 2 and having a radial width of approximately a quarter wavelength. In effect, the flange 18 and the corresponding wall area facing the flange constitute an open-ended quarter wave line which, as is well known, has a zero input impedance. Stated differently, the opening 10 in stationary guide 2 and the opening 13 in the rotatable guide 12 are coupled through a zero impedance which remains constant during rotation of guide 12. Numerals 19 and 20 denote respectively, a drive shaft and a motor therefor. The shaft is composed of a dielectric substance as, for example, Plexiglas, and it extends along the reflector axis 7. Shaft 19 passes through apex 21 of reflector 4, aperture antenna 14 and window 11 in opening 13, and terminates in window 11 in opening 10. It is rigidly secured to the window 11 in opening 13, so that guide 12 rotates with the shaft. The window 11 of opening 10 constitutes a bearing for the rotating shaft.

The embodiment illustrated by Fig. 2 differs from that illustrated by Fig. 1 primarily in that an inclined deflector 22 is utilized in guide 2 in place of the piston 8. Also the opening in guide 2 is connected to a stub guide section 23 having a circular opening 24 facing the opening 13 and equipped with a flange member 25. The flange 25 is the same as flange 18 and the two flanges form an open-ended quarter wavelength line 17 having a zero input impedance.

In operation, Figs. 1 and 2, centimetric waves polarized as shown by arrow 26 are supplied to main guide 2 by transceiver 1. The waves pass through orifice 9, then through window 11 in opening 10 of guide 2 and finally through window 11 in the opening 13 of guide section 12 to the aperture antenna 14. Piston 8, Fig. 1, and deflector 22, Fig. 2, prevent the waves from entering the upper half portion of guide 2 so that the upper half portion of the guide constitutes, in a sense, a dummy guide section. Also piston 8 is adjusted so as to tune the cavity 27 bounded by the orifice 9 and the piston, and to match the guide impedance to the impedance of opening 10 in the wall of guide 2. Similarly, in the embodiment of Fig. 2, deflector 22 is dimensioned and positioned at the proper angle for tuning cavity 28 and for matching the impedance of guide 2 to the impedance of the opening 10. The waves established in the rotatable guide section 12 and projected by the aperture antenna 14 toward reflector 4 are vertically polarized as shown by arrow 29. For the position of rotatable guide 12 shown in full lines on the drawing, the waves emitted by the aperture antenna 14 are propagated in direction 30, focused and reflected by reflector 4, and redirected in direction 31 which makes an angle $a$ with the reflector axis 7. With motor 20 in operation, the longitudinal axis 15 of guide 12 is rotated about the reflector axis 7 and therefore the mid-point 16 of the aperture antenna 14 is revolved in the focal plane 5 about the reflector focus 6. For the opposite position of guide section 12, as shown by the broken line 32, the waves as emitted by aperture antenna 14 have a direction 33 and after reflection by reflector 4 a direction 34.

Referring to Figs. 3 and 4, numeral 35 denotes the maximum directive lobe of the entire system, the lobe having a principal axis or radius 36 and a minor axis 37 about which the lobe rotates. The principal axis 36 is, of course, the same as the maximum direction of action referred to above. The minor axis 37 is aligned with the reflector axis 7. As guide section 12 rotates, the lobe axis 36 describes in space a cone 38, Fig. 4, and successively aligns with the directions 31 and 34 shown in Fig. 1. In Fig. 3, numerals 39 and 40 denote respectively, the opposite positions for the maximum lobe and its principal axis. Thus, if numeral 35 denotes the "up" position of the lobe, numeral 39 denotes the "down" position; and if numeral 35 designates the "left" position, numeral 39 designates the "right" position. As the lobe rotates, the angle $a$ remains substantially constant so that, in the plane 41 perpendicular to the reflector axis 7, the lobe axis 36 describes a circular, or slightly elliptical, cone having a diameter X in the horizontal or H plane substantially equal to the diameter Y in the E plane. The slight ellipticity in the scan is caused by the ellipticity of the aperture 14 and the angularity of the feed guide 12.

In reception, the waves reflected by a distant target are collected by reflector 4 and projected toward and into the aperture antenna 14. If the target is aligned with minor axis 37, the intensity of the received energy remains constant during the lobe rotation or conical scan. On the other hand, if the target is off the axis 37 and therefore off the reflector axis 7, waves of a cyclically varying intensity are received and conducted to transceiver 1. In transmission and reception the directive characteristic comprises primarily a single maximum lobe, inasmuch as the secondary or minor lobes are sufficiently small to be negligible. Also, the directive characteristic in the H or horizontal plane is symmetrical about the reflector axis 7 since, in this plane, the wave guide structure is symmetrically disposed relative to the reflector axis. In the vertical or E plane, the presence of the upper half or dummy portion of wave guide 2 renders the wave guide structure in front of reflector 4 symmetrical with respect to reflector axis 7 with the result that the directive characteristic is also symmetrical with respect to the axis 7 in this plane.

Thus far it has been assumed that continuous transmission occurs during one rotation of the lobe. In actual radar practice, a pulse is emitted and the echo pulse, if any, is received before emission of the next pulse, the spacing on a time axis between emitted pulses being related to the effective range of the radar. If the number of pulses per lobe rotation is relatively large as, for example, several hundred, the system operates substantially as described above. Again, a small number of emitted pulses per each conical scan may be employed and so-called dual plane lobe switching operation may be used. Thus, assuming eight pulses are emitted during each lobe rotation, numerals 42 to 49 inclusive, Fig. 4, denote the eight distinct paths or directions assumed by the lobe axis 36 during one rotation. These numerals also designate the intersections of these eight directions with the transverse plane 41. For lobe switching in the H or horizontal plane, the intensity of the echo pulse wave when the lobe axis 36 has the incoming "left" direction 42 (or 43) is compared to that of the echo pulse wave when the lobe axis 36 has the incoming "right" direction 46 (or 47); and for lobe switching in the E or vertical plane, the intensity of the echo pulse when the lobe axis 36 has the incoming "up" direction 44 (or 45) is compared to that of the echo pulse wave when the lobe axis 36 has the incoming direction 48 (or 49). In other words, as guide 12 rotates the echo pulses for the left and right positions of the lobe axis 36 are supplied to an "azimuthal plane" or "left-right" cathode tube indicator in the receiver and the echo pulses for the up and down positions of the lobe axis 36 are supplied to an "elevation plane" or "up-down" cathode tube indicator in the receiver. Assuming the target as, for example, a hostile aircraft, is not aligned with the reflector axis 7, the antenna system comprising the wave guide structure and reflector 4 is moved or adjusted, as required, in the horizontal and vertical planes for the purpose of aligning the reflector axis 7 with the target. With the reflector axis 7 aligned with the target, the echo pulses for the left and right positions of lobe axis 36 have equal intensities and the echo pulses for the up and down positions of the lobe axis 36 have equal intensities, and the absolute direction in space of the aircraft may be ascertained.

Fig. 5 illustrates a sectional view, taken in a vertical plane, of a system constructed in accordance with the invention and similar to one which has been tested. In this figure, numerals 50 and 51 denote respectively a dummy guide and a main guide, both of which have portions extending perpendicularly to axis 7 of reflector 4. The main guide has a transverse opening 10 and is connected to the transceiver 1 by a coaxial line 52 having an inner conductor 53 and an outer conductor 54. The inner conductor extends transversely into the main guide 51 so that, in operation, H₁₁ waves having a polarization 26 are transferred between guide 51 and line 52. Numeral 55 denotes an adjustable piston tuner which is positioned about a quarter wavelength from the inner conductor 53. As is known, piston 55 functions in a sense as a passave antenna reflector and produce unilateral propagation in guide 51, both in the case of transmitting and reception.

Numeral 56 denotes a dielectric supporting structure for the rotatable wave guide section 12 and the associated dielectric drive shaft 19. Shaft 19 comprises a Mycalex section 57 and a Plexiglas section 58. The support 56 comprises four dielectric rods 59 (only two illustrated) which extend through reflector 4 and are attached to the plate 60. Numeral 61 denotes a shaft for supporting plate 60. The rods 59 support the transverse polystyrene plates 62 and 63, each of which constitutes a bearing for shaft 19. The central circular portion or section 64 of plate 63 faces the opening 10 in guide 51 and also faces the polystyrene window 11 in the opening 13 of the rotatable guide 12. A zero impedance fixed coupling 17 is included between the opening 10 and the plate section 64; and a zero impedance rotatable coupling 17 is included between the polystyrene window 11 in opening 13 of guide section 12 and the plate section 64. The aperture antenna 14 at the end of rotatable guide 12 is preferably equipped with a polystyrene window 11 of uniform thickness. If desired, members 65 may be provided for the purpose of securing reflector 4 to the guides 50 and 51. The entire antenna system comprising reflector 4 and the rotatable wave guide 12 may be moved or rotated in horizontal and vertical planes as shown by arrows 66 and 67.

In view of the explanation given above in connection with Figs. 1 to 4, the operation of the system of Fig. 5 is believed to be apparent. Briefly, in operation, motor 20 causes a rotation of guide 12 and the maximum lobe of the transmitting or receiving directive characteristic describes in space a circular cone, the axis of the cone being aligned with the axis 7 of reflector 4. The direction of a particular target may be accurately determined by rotating the entire antenna, as required, in the horizontal and vertical planes, and aligning axis 7 with the target.

Although the invention has been explained in connection with certain embodiments, it is to be understood that it is not to be limited to the embodiments described inasmuch as other apparatus may be successfully utilized in practicing the invention.

What is claimed is:

1. In combination, a metallic wave guide connected to a transceiver and having an open end, and means for rotating said open end in its plane and about a point spaced from the midpoint of said open end.

2. In combination, a hollow reflector having a focus, a metallic air-filled wave guide having an open end facing said reflector, and means including a shaft attached to and extending inside said guide, for eccentrically rotating said open end about said focus.

3. In combination, a parabolic reflector, a wave guide antenna having a transverse antenna aperture positioned in the focal plane of said reflector, and means for eccentrically rotating at least the aperture end of said antenna about the reflector focus.

4. In combination, a paraboloidal reflector having a focus, a focal plane, and a principal axis, a first cylindrical air-filled metallic wave guide having a circular side opening centered on said principal axis and facing said reflector, a transceiver connected to said guide, a second wave guide having a longitudinal axis extending at an acute angle to said principal axis and at an acute angle to the longitudinal axis of the first guide, said second guide having at one end a first aperture included in said focal plane and having its center spaced from said focus and at the other end a second aperture facing said side opening in the first guide and spaced therefrom, means for rendering the impedance between said opening and said second aperture substantially zero comprising an annular flange attached to the periphery of said second aperture and having a radial width of a quarter wavelength at the operating frequency, substantially, and means for rotating said second guide about said principal axis.

5. In combination, a parabolic reflector having a principal axis, a transceiver, a stationary metallic wave guide connected to said transceiver and extending perpendicular to said axis, said guide having a side opening symmetrically aligned with said axis and facing said reflector, a rotatable metallic wave guide section having an end aperture facing said reflector and an end aperture coupled through a path of zero impedance to said opening; the longitudial axis of the rotatable guide being angularly related to the reflector axis, and means for eccentrically rotating said rotatable wave guide section.

6. In combination in accordance with claim 5, a dielectric window in each aperture of said rotatable guide section, and means comprising a dielectric shaft extending through the reflector apex and aligned with the reflector axis, one end of said shaft being attached to the window in the end aperture coupled to said opening and the other end of said shaft being attached to a motor.

ARCHIE P. KING.

REFERENCES CITED

The following references are of record in the file of this patent:

UNITED STATES PATENTS

| Number | Name | Date |
| --- | --- | --- |
| 1,828,705 | Kolster | Oct. 20, 1931 |
| 2,082,347 | Leib et al. | June 1, 1937 |
| 2,206,923 | Southworth | July 9, 1940 |
| 2,422,361 | Miller | June 17, 1947 |